United States Patent
Kress

(10) Patent No.: US 8,790,051 B2
(45) Date of Patent: Jul. 29, 2014

(54) EXPANDABLE REAMER

(75) Inventor: Dieter Kress, Aalen (DE)

(73) Assignee: Mapal Fabrik fur Prazisionswerkzeuge Dr. Kress KG (DE)

( * ) Notice: Subject to any disclaimer, the term of this patent is extended or adjusted under 35 U.S.C. 154(b) by 926 days.

(21) Appl. No.: 12/664,761

(22) PCT Filed: Jun. 18, 2008

(86) PCT No.: PCT/EP2008/004894
§ 371 (c)(1),
(2), (4) Date: Dec. 15, 2009

(87) PCT Pub. No.: WO2008/155104
PCT Pub. Date: Dec. 24, 2008

(65) Prior Publication Data
US 2010/0209205 A1     Aug. 19, 2010

(30) Foreign Application Priority Data

Jun. 20, 2007   (DE) .......................... 10 2007 028 167

(51) Int. Cl.
*B23D 77/10* (2006.01)

(52) U.S. Cl.
CPC ..................................... *B23D 77/10* (2013.01)
USPC ......................................... 408/156; 408/161

(58) Field of Classification Search
USPC .......... 408/153–156, 158, 161, 163, 168, 172
IPC .......... B23D 77/00, 77/02, 77/04, 77/06, 77/08, B23D 77/10
See application file for complete search history.

(56) References Cited

U.S. PATENT DOCUMENTS 1,074,820 A * 10/1913 Schellenbach ................ 408/160
1,451,741 A *  4/1923 Miller ........................... 408/168
1,451,742 A *  4/1923 Miller ........................... 408/168
(Continued)

FOREIGN PATENT DOCUMENTS

CH      514 387         10/1971
CH      666 643 A5      8/1988
(Continued)

OTHER PUBLICATIONS

EPO website machine translation of DE 19950168, printed Apr. 2014.*
(Continued)

*Primary Examiner* — Daniel Howell
(74) *Attorney, Agent, or Firm* — Ostrolenk Faber LLP

(57) ABSTRACT

The present disclosure relates to an expandable reamer having a base body, a ring section, at least one cutting edge which is geometrically defined and provided on the outer surface of the ring section, an adjustment device which works on the ring section from the inside, has an adjustment screw, and serves to adjust the radial position of the at least one cutting edge, wherein the adjustment device is arranged in a cavity provided in the base body of the expandable reamer, and an adjustment body with a conical or round outer surface. The adjustment body can be displaced in the direction of the central axis of the expandable reamer and serves for the expansion of the ring section. The expandable reamer is characterized in that the adjustment body is designed as an adjustment sleeve which surrounds the adjustment screw and is mounted in a floating manner.

18 Claims, 4 Drawing Sheets

(56) References Cited

U.S. PATENT DOCUMENTS

| | | | | |
|---|---|---|---|---|
| 1,697,509 | A | * | 1/1929 | Marty, Jr ..................... 408/156 |
| 1,745,660 | A | * | 2/1930 | Denning ..................... 408/156 |
| 1,998,113 | A | * | 4/1935 | Anderson et al. ............ 408/175 |
| 2,093,742 | A | * | 9/1937 | Staples ..................... 408/156 |
| 2,093,986 | A | | 11/1937 | Staples |
| 2,206,941 | A | * | 7/1940 | Cogsdill ..................... 408/156 |
| 2,352,508 | A | * | 6/1944 | Archer ..................... 408/160 |
| 2,556,372 | A | * | 6/1951 | Johnston et al. ............ 408/171 |
| RE24,039 | E | * | 7/1955 | Billeter ..................... 82/1.2 |
| 3,764,224 | A | | 10/1973 | Merz ..................... 408/231 |
| 6,575,672 | B1 | * | 6/2003 | Maier ..................... 408/59 |

FOREIGN PATENT DOCUMENTS

| | | |
|---|---|---|
| DE | 195 11 257 A1 | 10/1995 |
| DE | 199 50 168 A1 | 5/2001 |
| DE | 101 17 990 C1 | 7/2002 |
| EP | 0 324 909 B1 | 7/1989 |
| EP | 0 504 100 A | 9/1992 |
| JP | 2001105231 A * | 4/2001 |

OTHER PUBLICATIONS

International Search Report dated Sep. 1, 2008, issued in corresponding international application No. PCT/EP2008/004894.

Notification of Transmittal of Translation of the International Preliminary Report on Patentability dated Jan. 21, 2010, International Preliminary Report on Patentability, and Written Opinion of the International Searching Authority (8 pages total).

Office Action dated Aug. 22, 2012 issued in corresponding European Patent Application No. 11 006 667.7 with English Machine Translation (5 pages).

* cited by examiner

EXPANDABLE REAMER

CROSS REFERENCE TO RELATED APPLICATIONS

The present application is a 35 U.S.C. §371 National Phase conversion of PCT/EP2008/004894, filed Jun. 18, 2008, which claims benefit of German Application No. 10 2007 028 167.8, filed Jun. 20, 2007, the disclosure of which is incorporated herein by reference. The PCT International Application was published in the German language.

TECHNICAL FIELD

The invention relates to an expandable reamer The expanding reamer is an expandable reamer.

BACKGROUND

Expanding reamers of the type which are here discussed are known. They have a basic element, as well as an annular portion on whose outer face there is defined at least one geometrically defined cutting edge. The radial position of the at least one cutting edge is adjusted by means of an adjusting device comprising an adjusting screw. For this purpose, an adjusting element of the adjusting device, having a conical or spherical outer face, is moved with the aid of the adjusting screw in the direction of the center axis of the expanding reamer, so that it widens the annular portion to a greater or lesser extent. It has been shown that the adjusting element of the adjusting device is subjected to high wear and that an exact positioning of the at least one cutting edge often fails, because the position of the adjusting element is dependent on the position of the thread in the basic element in which the adjusting screw engages. The thread is frequently not exactly concentric to the center axis of the expanding reamer, so that the radius of the at least one cutting edge is not precisely adjustable. If the expanding reamer has a plurality of geometrically defined cutting edges, it is in many cases not possible to adjust these such that they lie exactly on the same orbit.

SUMMARY

The object of the invention is therefore to provide an expanding reamer which does not have these said drawbacks.

In order to achieve this object, an expanding reamer is proposed which comprises the features stated in Claim 1. It is characterized in that the adjusting element is not an integral component part of the adjusting screw, but rather is configured as an adjusting sleeve which encompasses the adjusting screw and is mounted floatingly thereon. By the term "floating" is conveyed that the adjusting sleeve is displaceable both in the axial and in the radial direction relative to the adjusting screw and can thus perform compensating motions. It thus comes to bear optimally from inside against the annular portion of the expanding reamer, so that the at least one geometrically defined cutting edge is very precisely adjustable. The floating mounting of the adjusting sleeve on the adjusting screw means that when the adjusting screw is rotated, i.e. is turned to adjust the radial position of the at least one cutting edge, the adjusting sleeve remains rotationally fixed in the annular portion and is thus subjected to reduced wear.

A preferred illustrative embodiment is characterized in that the adjusting screw has at one end an external thread and at its other end a head, which latter, on its side facing the thread, has a contact surface. This is borne against by the adjusting sleeve, which, upon an appropriate rotary motion of the screw in the direction of its rotational axis, i.e. in the direction of the center axis of the expanding reamer, can be displaced such that the annular portion with the at least one cutting edge is widened. The adjusting element is thus part of a wedge gear, which, upon appropriate axial displacement of the adjusting sleeve, effects a widening of the annular portion and thus for the positioning of the at least one cutting edge.

In a further preferred illustrative embodiment, it is provided that the adjusting device has an extraction device, which serves, when the adjusting screw is loosened, to apply an axial force to the adjusting sleeve in order to extract this from the expanding reamer. It is thus possible to configure the adjusting device as a structural unit, which can be inserted into the expanding reamer and can be removed from this without difficulty.

Further embodiments emerge from the remaining subclaims.

BRIEF DESCRIPTION OF THE FIGURES

The invention is explained in greater detail below with reference to the figures.

DETAILED DESCRIPTION

Figure 1:
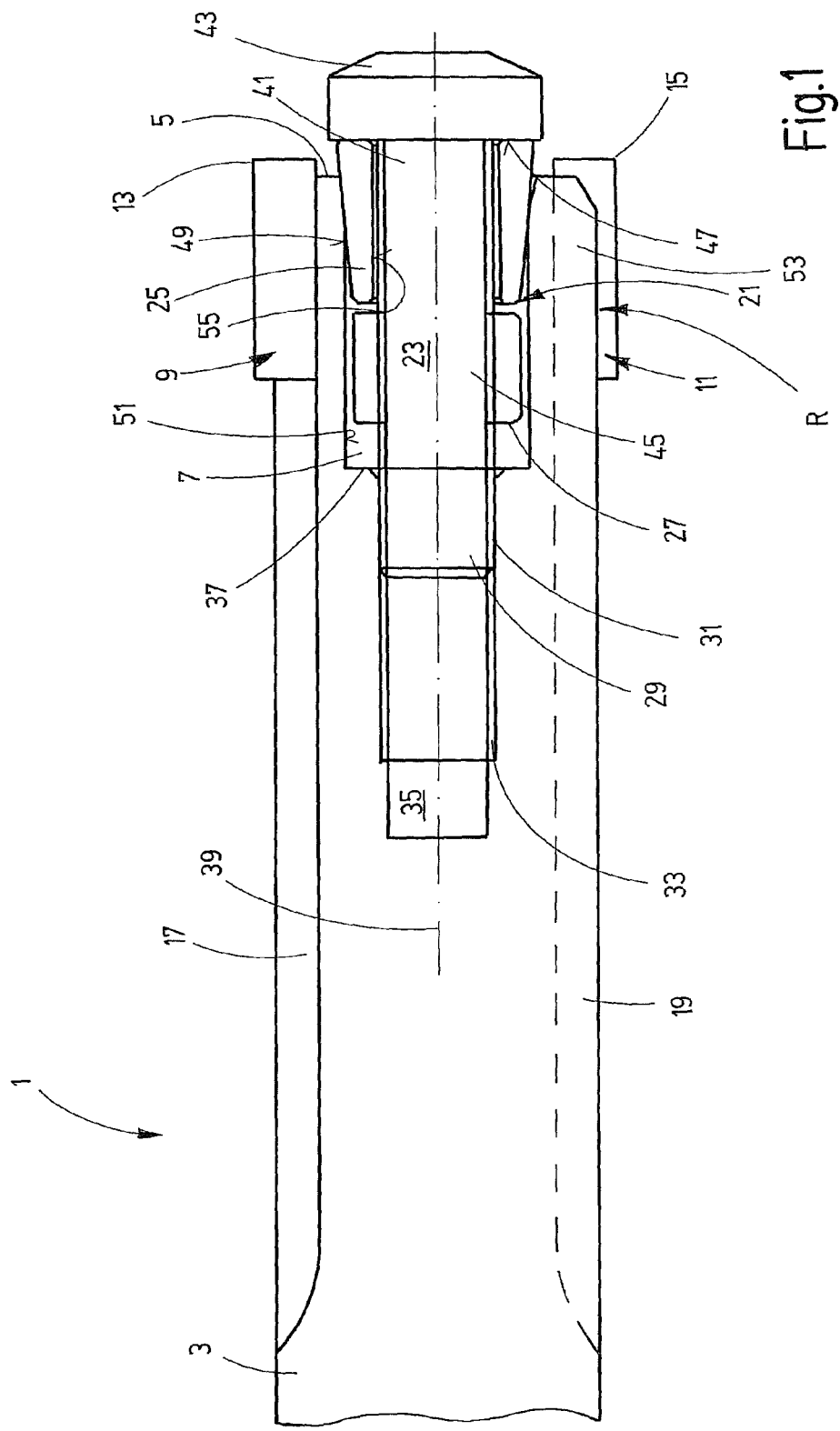
FIG. 1 shows a basic diagram of the front part of a first illustrative embodiment of an expanding reamer in longitudinal section.

From FIG. 1, the front part of a first illustrative embodiment of an expanding reamer 1 is visible. Its left end is broken off and can be configured in any chosen known manner and can have a mounting shaft with which the expanding reamer 1 can be attached in a rotationally fixed manner directly to a machine tool, or else to an intermediate piece, adapter or the like. The expanding reamer 1 has a basic element 3, in which from the right, i.e. from an end face 5, a cavity 7 is made.

In a region of the basic element 3 close to the end face 5, i.e. in an annular portion R, the expanding reamer 1 is provided with at least one geometrically defined cutting edge. In the illustrative embodiment represented here, four cutting inserts, arranged in pairs one opposite the other, are apparent, namely an upper cutting insert 9 and a lower cutting insert 11. The cutting inserts have, at their end facing the end face 5, geometrically defined cutting edges 13 and 15. In principle, it is possible to configure the cutting edges directly on the basic element 3 of the expanding reamer 1. Preferably, however, cutting inserts are inserted as known into the basic element 3, which cutting inserts can be formed from a particularly hardwearing material, particularly in the region of the geometrically defined cutting edges.

The cutting edges 13 and 15 remove chips from a bore surface, generally by the expanding reamer 1 being set in rotation, while the workpiece stands still. It is also conceivable, however, to rotate the workpiece while the expanding reamer 1 remains fixed. Only a relative rotary motion between the cutting edges and the bore surface is critical.

In the basic element 3, in the region of the cutting inserts 5, chip spaces 17 and 19 are provided, which serve to carry off chips removed by the cutting edges 13 and 15 in order to prevent these from impairing the bore surface.

The cavity 7 serves to receive an adjusting device 21 comprising an adjusting screw 23, referred to as a setscrew, an adjusting element, which is preferably configured as an adjusting sleeve 25 encompassing the adjusting screw 23, and an extraction device 27.

The adjusting screw 23 has at its first end 29 an external thread 31, which cooperates with an internal thread 33. The latter is made in the wall of a bore 35, which extends from the floor 37 of the cavity 7 further inward into the basic element 3 of the expanding reamer 1. The cavity 7, the bore 35 and the adjusting screw 23 are arranged concentric to a center axis 39, referred to as the rotational axis, of the expanding reamer 1.

At the second end 41 of the adjusting screw 23, which second end lies opposite the first end 29, a head 43 is provided, the external diameter of which is larger than that of the shaft 45 of the adjusting screw 23, which shaft is provided with the external thread 31. On the head 43 a contact surface 47 is hence formed, which points toward the first end 29 of the adjusting screw 23 and is borne against by the—in FIG. 1—right end of the adjusting sleeve 25, i.e. the axial end face thereof.

The outer face 49 of the adjusting sleeve 25 is conically or spherically configured. It has a first region which bears against the contact surface 47 and the external diameter of which is larger than the internal diameter of the cavity 7. The opposite, left end of the adjusting sleeve 25 has an external diameter which is smaller than the internal diameter of the cavity 7, so that the adjusting sleeve 25 can engage in the cavity 7.

The inner face 51 of the cavity 7 can be cylindrically configured up to the end. Preferably, however, it is made to be conically or spherically configured close to the end face 5, so that it bears in an annular region 53 against the outside of the adjusting sleeve 25. Depending on the design of the region of the inner face 51 close to the end face 5, this annular region 53 lies more or less far inside the cavity 7 at a distance from the end face 5.

The cutting edges of the expanding reamer 1, which are here configured as cutting edges 13 and 15 of the cutting inserts 9 and 11, thus lie in an annular region 53 of the expanding reamer 1, which annular region can be widened more or less extensively by the adjusting device 21 in order to adjust and set the radial position of the cutting edges 13 and 15. The annular region 53 here lies in the front portion, facing the end face 5, of the annular portion R.

Between the inner face 51 of the cavity 7 and the outer face 59 of the adjusting sleeve, a wedge gear is therefore configured, with the aid of which an axial motion of the adjusting sleeve 25 in the direction of the center axis 39 is converted into a more or less wide radial widening of the annular region 53 so as to realize a radial positioning of the cutting edges 13 and 15 in relation to the center axis 39.

The basic working of such a wedge gear is known. It is therefore clear that the outer face 49 of the adjusting sleeve 25 is preferably of conical or wedge-shaped configuration, while the inner face 51 of the cavity 7, in the region of contact with the outer face 49, is preferably of spherical configuration, i.e.—viewed in cross section—has a radius and widens in the direction of the end face 5.

The inner face 55 of the adjusting sleeve 25 has an internal diameter which is somewhat larger than the external diameter of the shaft 45 of the adjusting screw 23. The adjusting sleeve 25 is thus movable on the shaft 45 in the axial direction of the adjusting screw 23, i.e. in the direction of the center axis 39, but also, in particular, in the radial direction to the center axis 39. Should the bore 35, therefore, not run exactly concentric to the center axis 39, the adjusting sleeve 25 can nevertheless align itself on the inner face 51 of the cavity 7 and thus ensure an optimal setting of the at least one cutting insert.

Since the adjusting sleeve 25 is configured separate from the adjusting screw 23, the material properties can also be freely chosen so as to influence the sliding properties of the adjusting sleeve 25 in relation to the inner face 51 of the cavity 7, but also of the adjusting sleeve 25 in relation to the contact surface 47.

The adjusting device 21 has, as stated, an extraction device 27. This serves to be able to remove the adjusting sleeve 25 easily from the cavity 7 when the adjusting screw 23 is loosened. The extraction device 27 is enclosed by the adjusting sleeve 25 in the cavity 7, which extraction device is thus situated to the left of the adjusting sleeve 25 in the cavity 7. When the adjusting screw 23 is moved outward from the cavity 7, i.e. to the right in FIG. 1, the extraction device 27 takes with it the adjusting sleeve 25.

The extraction device 27 can, as here, be configured as a threaded sleeve, which is screwed onto the shaft 25 of the adjusting screw 23 and is arranged at a suitable distance—measured in the direction of the center axis 39—from the adjusting sleeve 25. If it has the desired relative position to the adjusting sleeve 25, the threaded sleeve is fixed in a suitable manner on the shaft 45, for example by gluing, soldering, welding, or else also by deformation. When the adjusting screw 23 is unscrewed, the threaded sleeve can thus no longer be displaced on the shaft 45 and pulls the adjusting sleeve 25 out of the interior 7.

It will be clear that, instead of the threaded sleeve, a pin running transversely to the shaft 45, or else also an annular collar, can be provided, the external diameter of which is dimensioned such that it butts against the left end of the adjusting sleeve 25 when the adjusting screw 25 is unscrewed from the basic element 3 of the expanding reamer 1. Thus the ring collar, too, as also a corresponding pin, pulls the adjusting sleeve 25 out of the cavity 7.

The adjusting device 21 thus preferably forms an assembly unit, which can be easily inserted into and removed from an expanding reamer 1.

Adjusting sleeves 25 matched to the inner face 51 of the cavity 7 and having a more or less steep apex angle of the outer face 49 can thus be provided, which are respectively inserted into an expanding reamer 1 in order to achieve a specific adjusting behavior, i.e. a specific gear ratio of the bevel gear.

From the representation according to FIG. 1, it can be seen that the adjusting device 21 is very compact and can be used even in expanding reamers 1 with very small diameter. Thus, even expanding reamers with a machining diameter of 5 mm and less can be combined with an adjusting device 21 of the type here discussed. In this context, the adjusting behavior of the adjusting device 21 can be influenced by the design of that region of the inner face 51 of the cavity 7 which borders the end face 5, in particular of the annular region 53 cooperating with the adjusting sleeve 25, and the outer face 49 of the adjusting sleeve 25. It is thus possible to realize an adjusting sleeve 25 with a very shallow-angled outer face 49, so that an axial adjusting motion of the adjusting sleeve 25 leads only to a very small radial widening of the annular region 53. The expanding reamer 1 can thus be very sensitively adjusted.

Figure 2:
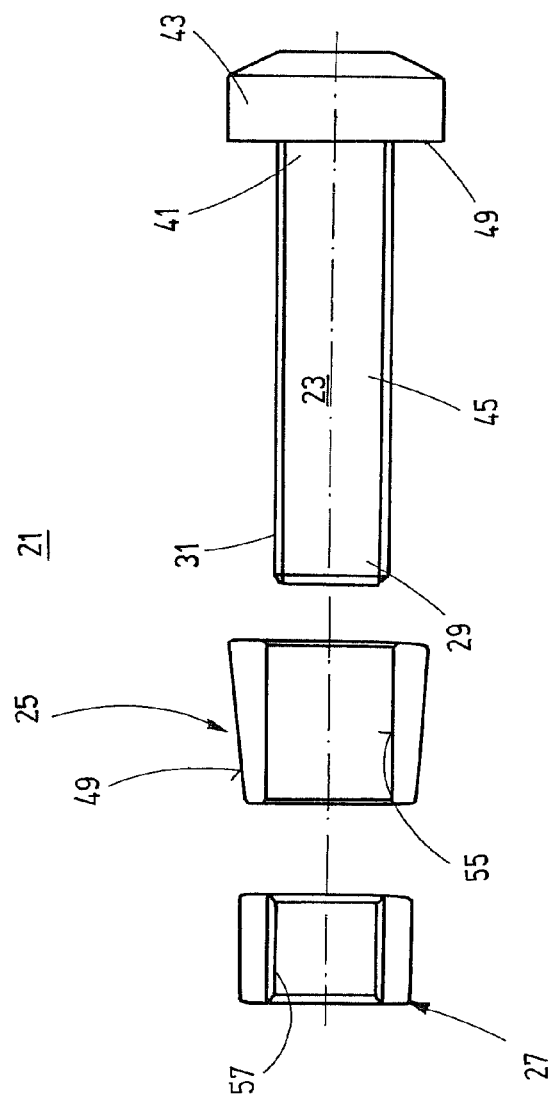
FIG. 2 shows an exploded representation of the adjusting device of the expanding reamer, which is visible from FIG. 1.

FIG. 2 shows the adjusting device 21 visible from FIG. 1 in exploded representation, in order that the individual parts thereof once again become clearly apparent. Identical parts are provided with identical reference numerals, so that, in this respect, reference is made to the description to FIG. 1.

The adjusting device 21 thus has an adjusting screw 23 provided with a head 43 and a shaft 45. At least at that first end 29 of the adjusting screw 23 lying opposite the head 23, an external thread 31 is provided. It must extend sufficiently far to the right in the direction of the second end 41 of the shaft 45 that the extraction device 27, which is here configured as a threaded sleeve and is provided with an internal thread 57 mating with the external thread 31, can be screwed correspondingly far onto the shaft 45, as can be seen from FIG. 1. The internal diameter of the inner face of the adjusting sleeve 25 is modeled on the external diameter of the shaft 45 of the adjusting screw 23 in such a way that the adjusting sleeve 25 can be easily slid onto the adjusting screw 23 and has radial play relative to the shaft 45 thereof. A mispositioning of the adjusting screw 23 does not therefore readily lead to an influencing of the adjusting sleeve 25, so that the latter can ensure a very exact adjustment of the at least one cutting edge, here the cutting edges 13 and 15, so that these lie on a common orbit.

Figure 3:
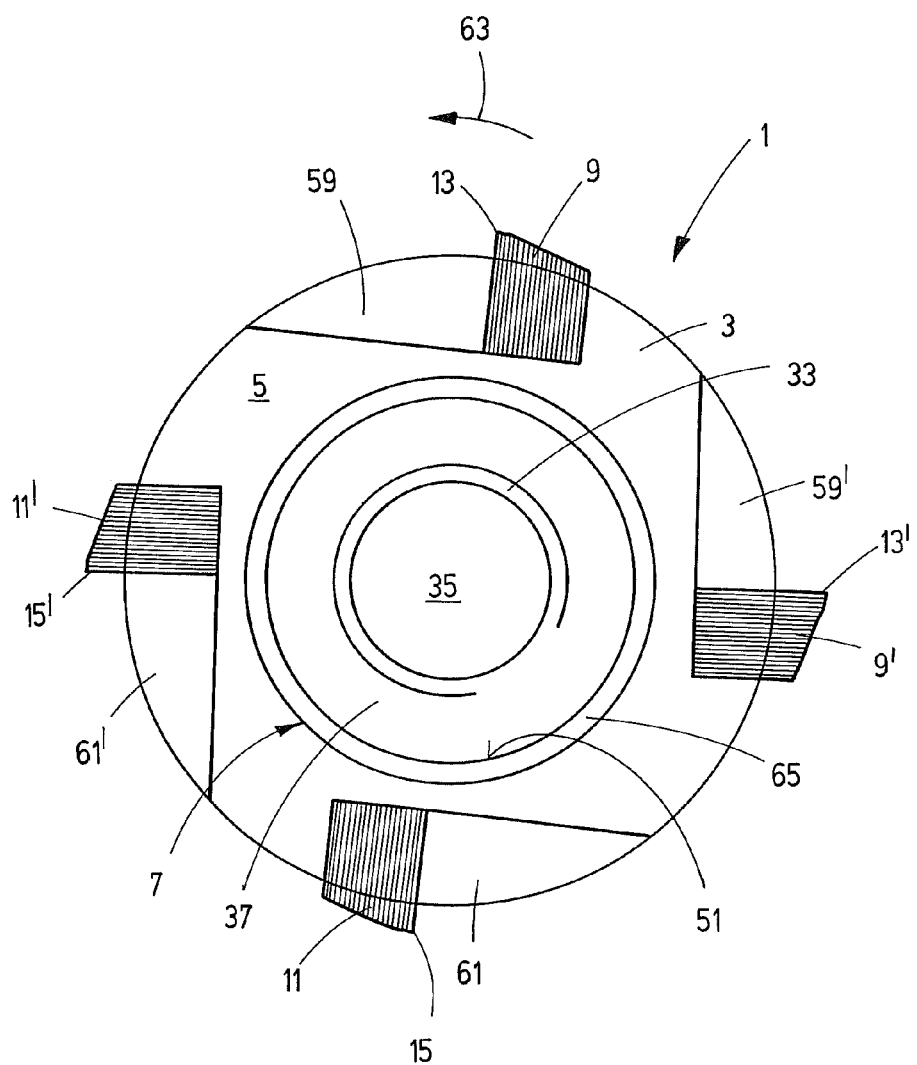
FIG. 3 shows a front view of the expanding reamer according to FIG. 1, without adjusting device.

FIG. 3 shows the expanding reamer 1 in front view, i.e. a top view of the end face 5 represented in FIG. 1. Inserted in the basic element 3 are at least one, here four cutting inserts, of which the cutting inserts 9 and 11 were visible in FIG. 1. The cutting edges 9' and 11', which are correspondingly offset by about 90°, are identically configured, so that there is nothing further to be stated in this regard.

The cutting inserts 9, 9', 11 and 11' are inserted in recesses 59, 61, 59' and 61' made in the basic element 3 of the expanding reamer 1, so that in front of the cutting edges 9, 11, 9', 11', in the rotational direction represented by an arrow 63, a chip space is respectively obtained, via which chips removed from the cutting edges 13, 15, 13', 15' can be transported away via the chip space.

From FIG. 3 it can further be seen that in the end face 5 of the basic element 3 of the expanding reamer 1 a cavity 7 is made. A double line indicates that the inner face of the cavity 7 merges via a conically or spherically configured transition region 65 into the end face 5. It is also clearly apparent that in the floor 37 of the cavity 7 a bore 35 is made, comprising an internal thread 33 in which the adjusting screw 23 engages.

The end face according to FIG. 3 also shows that the expanding reamer 1 is provided with four cutting edges 13, 15, 13', 15', which—viewed in the peripheral direction—are arranged at an approximately equal distance apart.

It is possible in principle to provide the expanding reamer 1 with at least one cutting edge. Two or three cutting edges can also be provided. The expanding reamer 1 is supported particularly evenly in a bore to be machined, if six cutting edges are provided.

In an expanding reamer 1 intended for the machining of bores with small internal diameter, four cutting edges are preferably provided in order that the basic element 3 is not overly weakened and thus particularly small machining diameters can be realized.

Figure 4:
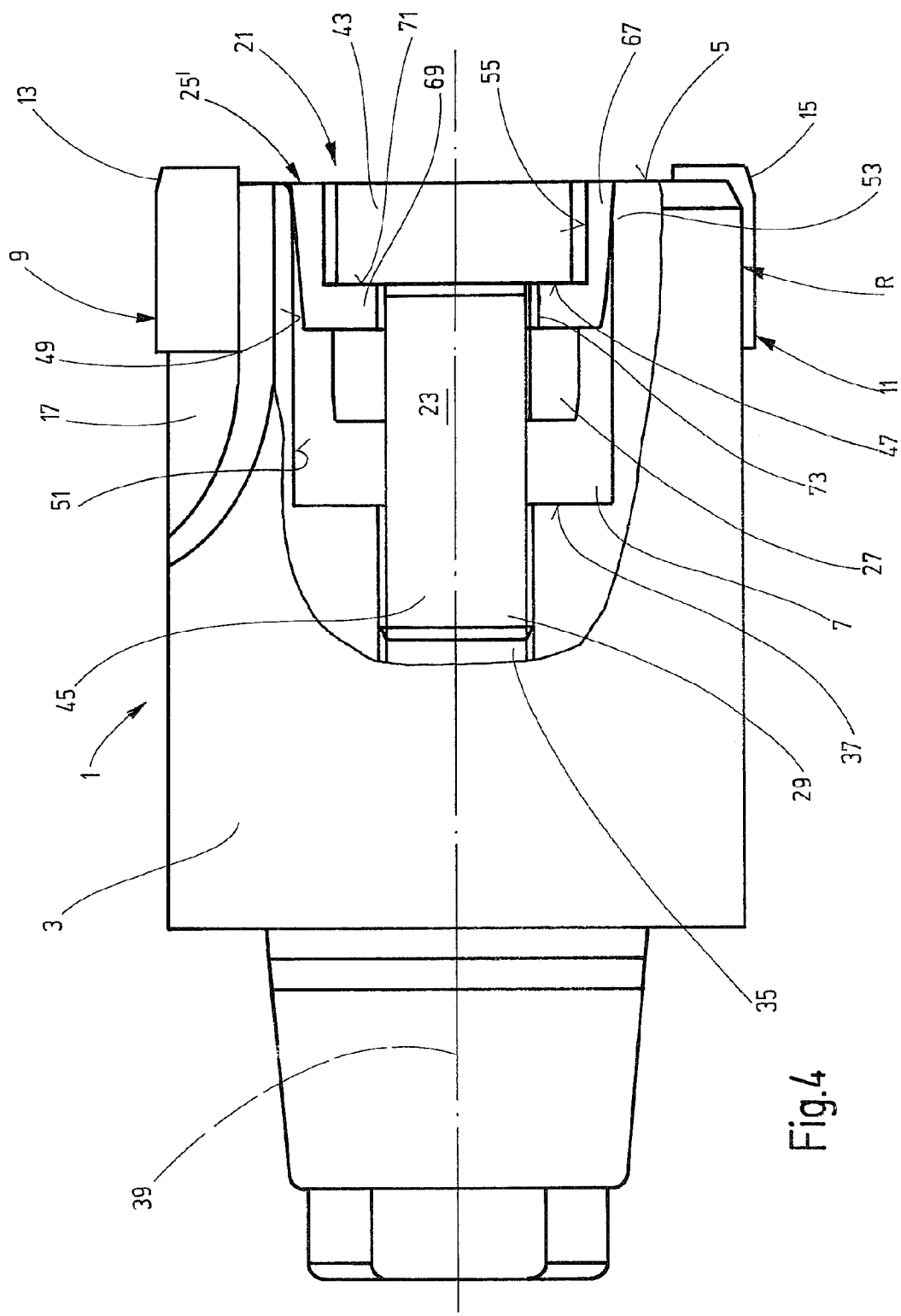
FIG. 4 shows a partially cut-open side view of a second illustrative embodiment of an expanding reamer.

A second illustrative embodiment of an expanding reamer is obtained from FIG. 4, which portrays the expanding reamer 1 in side view, the side wall being partially cut open. Identical and functionally identical parts are provided with identical reference numerals, so that, in this respect, reference is made to the description of the preceding figures.

The illustrative embodiment of the expanding reamer 1 which can be seen from FIG. 4 differs from that represented in the preceding figures by the fact that the internal diameter of the cavity 7 is chosen such that it can receive an adjusting element, which here is likewise configured as an adjusting sleeve 25'. The adjusting sleeve 25' is here dimensioned such that its inner face 55 does not touch the outer face of the head 43 of the adjusting screw 23. The adjusting sleeve 25' thus here receives not only the shaft 45, but also the head 43 of the adjusting screw 23. The adjusting sleeve 25' in this case has an outer wall 67, which surrounds the head 43 of the adjusting screw 23. The outer wall 67 merges into a floor 69 of the adjusting sleeve 25', which forms a supporting surface 71 for the bearing surface 47 of the head 43 of the adjusting screw 23.

The space enclosed by the outer wall 67 is dimensioned such that it receives the head 43 of the adjusting screw—preferably in full; it is thus preferably arranged recessed in the adjusting sleeve 25'.

The floor 69 is provided with a through hole 73, the center axis of which coincides with the center axis 39 of the expanding reamer 1. The internal diameter of the through hole 73 is chosen such that the floor 69 does not touch the outer face of the shaft 45, and the adjusting sleeve 25', like the adjusting sleeve 25 of the illustrative embodiment of the expanding reamer represented in FIGS. 1 to 3, is mounted floatingly on the adjusting screw 23. The adjusting sleeve 25' is thus movable on the shaft 45 in the axial direction of the adjusting screw, i.e. in the direction of the center axis 39, but also, in particular, in the radial direction to the center axis 39. Should the through hole 73, therefore, not run exactly concentric to the center axis 39, then the adjusting sleeve 25' can nevertheless align itself on the inner face 51 of the cavity 7. Hence, an optimal setting of the at least one cutting insert of the expanding reamer 1 is here too ensured.

While therefore the head 43 of the adjusting screw 23 rests on an annular face of the adjusting sleeve 25 in the illustrative embodiment according to FIGS. 1 to 3, the adjusting screw 23 engages inside the adjusting sleeve 25' in such a way that also the head 43 of the adjusting screw 23 is received by the adjusting sleeve 25 and rests with its contact surface 47 inside the adjusting sleeve 25' on the supporting surface 71 of the adjusting sleeve 25'. The contact surface 47 thus cooperates with a supporting surface 71 provided inside the adjusting sleeve 25'.

The adjusting screw 23, just like the adjusting sleeve 25', can thus be accommodated recessed in the end face 5 of the expanding reamer 1, so that this can be used also to machine bottomed bores or blind holes, i.e. bores which are not configured as a through hole, but instead have a floor.

The outer face 49 of the adjusting sleeve 25', as in the first illustrative embodiment, is conically configured and cooperates with the inner face 51 of the cavity 7, which, as described above, can be spherically configured in an annular region 53.

Here, as in the first illustrative embodiment, it is also possible to configure the outer face 49 of the adjusting sleeve 25' spherically and the inner face 51 of the cavity 7 conically. In both cases, a wedge gear is realized. If the adjusting sleeve 25' is moved—to the left in FIG. 4—into the cavity 7, then the annular portion R is radially widened. This leads to a radial adjustment of the cutting edges of the expanding reamer 1, of which, in FIG. 4, the cutting edges 13 and 15 can be seen.

While in the first illustrative embodiment the adjusting sleeve 25, on an axial end face configured as an annular surface, is subjected to a force via the contact surface 47 of the adjusting screw 23, in the second illustrative embodiment according to FIG. 4 it is provided that the adjusting forces of the adjusting screw 23 act upon the floor 69 of the adjusting sleeve 25'. For this purpose, the bearing surface 47 of the head 43 of the adjusting screw 23 rests on the floor 69, namely on its supporting surface 71. If the adjusting screw 23 is screwed into the basic element 3 of the expanding reamer 1, i.e. is moved to the left in FIG. 4, then the adjusting sleeve 25' is pulled and not, as in the first illustrative embodiment, pushed inside the cavity 7.

From FIG. 4 it becomes clear that the floor 69 of the adjusting sleeve 25' is preferably arranged at a greater distance from the end face 5 of the expanding reamer than the annular region 53 acted upon by the adjusting forces of the adjusting sleeve 25'. The force transmission of the adjusting screw 23 thus lies in FIG. 4 also to the left of the annular region 53 of the annular portion R.

This results, if the adjusting sleeve 25' is pulled into the cavity 7 in the setting of the cutting edges of the expanding reamer 1, in the achievement of more precise setting results than is the case in the illustrative embodiment according to FIGS. 1 to 3.

As can be seen from FIG. 4, the adjusting device 21 can here too comprise an extraction device 47 on the shaft 45 of the adjusting screw 23, with the aid of which the adjusting sleeve 25', when the adjusting screw 23 is loosened, can be pulled out of the cavity 7 of the expanding reamer 1. That which has been stated about the extraction device 47 of the first illustrative embodiment of the expanding reamer 1 applies here correspondingly.

Here too, the adjusting device 21 can be realized as a prefabricated assembly unit, which comprises the adjusting screw 23, the adjusting element configured as an adjusting sleeve 25', and the extraction device 27. The above-described advantages are thus obtained, namely the facility to combine a variety of adjusting devices 21 with different expanding reamers 1.

What is claimed is:

1. An expandable reamer comprising
a basic element,
an annular portion,
at least one geometrically defined cutting edge provided on an outer face of the annular portion, and
having an adjusting device, acting upon the annular portion from inside and comprising an adjusting screw, for adjusting the radial position of the at least one cutting edge, wherein
the adjusting device is disposed in a cavity provided in the basic element of the expandable reamer and has an adjusting element having a conical or spherical outer face, which adjusting element is displaceable in the direction of the center axis of the expandable reamer and serves to widen the annular portion,
wherein the adjusting element is configured as an adjusting sleeve, said adjusting sleeve having an outer wall, an inner face of which outer wall surrounds a head of the adjusting screw at a distance such that the adjusting sleeve is floatingly mounted on the adjusting screw in a manner such that the adjusting sleeve is displaceable in both an axial and a radial direction relative to the adjusting screw,
wherein
said cavity comprises an inner face; and
the inner face comprises a spherical or conical annular region.

2. The expandable reamer according to claim 1, wherein the adjusting screw has at a first end an external thread, which engages in the basic element of the expandable reamer, a shaft, which reaches through the adjusting sleeve and is arranged concentric to the center axis of the expandable reamer, and, at a second end lying opposite the first end, a head having a contact surface, which contact surface faces the first end and is borne against by the adjusting sleeve.

3. The expandable reamer according to claim 2, wherein forces can be transmitted via the contact surface of the head of the adjusting screw into an axial end face of the adjusting sleeve.

4. The expandable reamer according to claim 2, wherein the contact surface of the head of the adjusting screw cooperates with a supporting surface inside the adjusting sleeve.

5. The expandable reamer according to claim 4, wherein the supporting surface is provided on a floor of the adjusting sleeve.

6. The expandable reamer according to claim 4, wherein the head of the adjusting screw can be disposed inside the adjusting sleeve.

7. The expandable reamer according to claim 6, wherein the head of the adjusting screw is fully recessed inside the adjusting sleeve.

8. The expandable reamer according to claim 4, wherein the head of the adjusting screw is arranged recessed in the end face of the expandable reamer.

9. The expandable reamer according to claim 5, wherein—viewed from the end face—the distance of the floor of the adjusting sleeve from the end face of the expandable reamer is greater than the distance of the annular region of the inner face of the cavity therefrom.

10. The expandable reamer according to claim 1, wherein the adjusting device has an extraction device, which is enclosed by the adjusting sleeve in the cavity provided in the basic element of the expandable reamer.

11. The expandable reamer according to claim 10, wherein the extraction device is configured as a threaded sleeve.

12. The expandable reamer according to claim 1, wherein the cavity in the expandable reamer has a region having a conical or spherical inner face which cooperates with the outer face of the adjusting element.

13. The expandable reamer according to claim 1, wherein the annular portion is part of the basic element of the expandable reamer.

14. The expandable reamer according to claim 1, wherein the reamer has at least two, geometrically defined cutting edges.

15. The expandable reamer according to claim 14, wherein the cutting edges are arranged at roughly equal peripheral distance apart on the outer face of the annular portion.

16. The expandable reamer according to claim 1, wherein the material at least of the outer face of the adjusting element is chosen independently of the material of at least one of the annular region and the adjusting screw.

17. The expandable reamer according to claim 8, wherein the adjusting sleeve is arranged recessed in the end face of the expandable reamer.

18. The expandable reamer according to claim 14, wherein the reamer has a number of geometrically defined cutting edges selected from the group consisting of three, four and six such cutting edges.

* * * * *